(No Model.)　　　　　　F. E. DAVIS.　　　　2 Sheets—Sheet 1.
CULTIVATOR.

No. 553,704.　　　　　　　　　Patented Jan. 28, 1896.

Witnesses:　　　　　　　　　　　Inventor;
　　　　　　　　　　　　　　　　Frank E. Davis (No Model.) 2 Sheets—Sheet 2.

F. E. DAVIS.
CULTIVATOR.

No. 553,704. Patented Jan. 28, 1896.

Witnesses,
D. Mann
F. C. Goodrum

Inventor
Frank E. Davis
By Offield, Towle & Linthicum
Attys.

UNITED STATES PATENT OFFICE.

FRANK E. DAVIS, OF LA CROSSE, WISCONSIN, ASSIGNOR TO ALBERT HIRSH-HEIMER, OF SAME PLACE.

CULTIVATOR.

SPECIFICATION forming part of Letters Patent No. 553,704, dated January 28, 1896.

Application filed March 16, 1894. Serial No. 503,864. (No model.)

*To all whom it may concern:*

Be it known that I, FRANK E. DAVIS, of La Crosse, Wisconsin, have invented certain new and useful Improvements in Cultivators, of which the following is a specification.

This invention relates to that class of cultivators in which the earth-engaging devices are in the form of rotatable disks; and the object of the invention is to provide a cultivator of this class having the disks arranged in three gangs, two outer and one intermediate, each outer gang consisting preferably of a pair of disks mounted or rotatably attached to a frame capable of manual adjustment laterally, and an intermediate gang consisting of two or more disks which are mounted upon a laterally-movable frame pivoted forward of the axle and capable of being swung upon its pivot, whereby to enable the free lateral swing of the disks carried by such frame in the act of cultivating independently of the outer gangs. The disks carried by the swinging frame are preferably arranged in advance of those in the outer gang. In implements of this class it is feasible to employ earth-engaging devices in the form of disks or shovels, which are set at defined distances apart, and which operate between the rows of plants without danger of uprooting them; but it is very desirable to employ in addition to these sets of cultivating devices a laterally-adjustable gang intended to straddle the row and the disks of which can be used close up to the plants and shifted to avoid uprooting them. This I accomplish by an exceedingly simple arrangemement capable of easy operation when in use, and which is also capable of adjustment manually.

Figure 1:
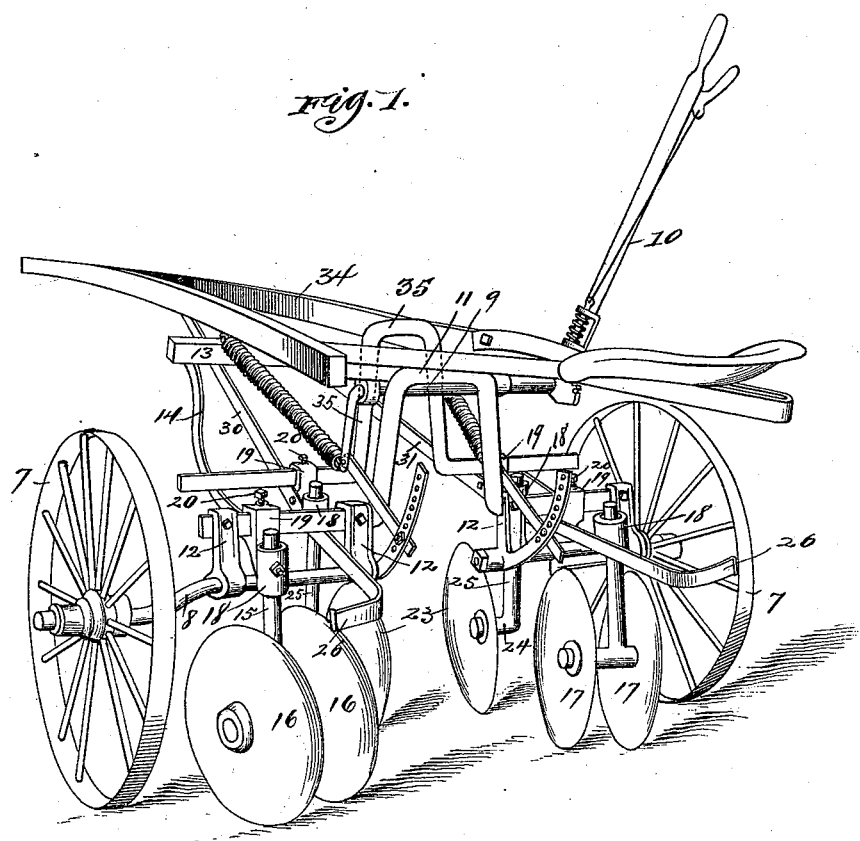
Figure 3:
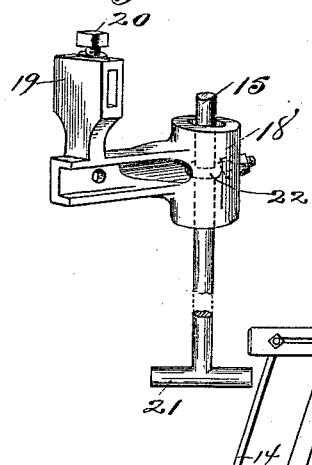
Figure 2:
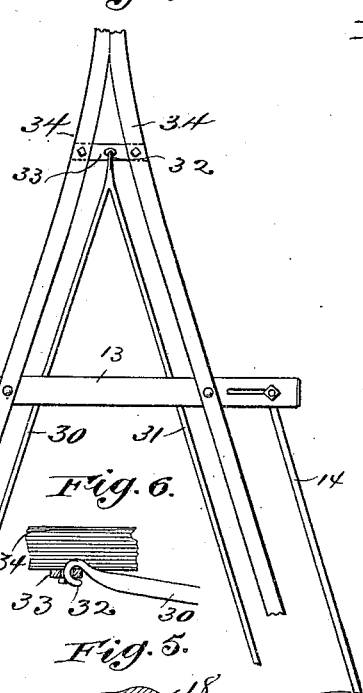
Figure 4:
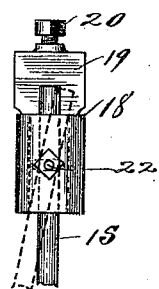
Figure 6:
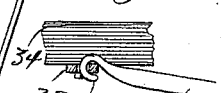
Figure 5:
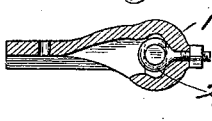

In the accompanying drawings, Figure 1 is a perspective view of a cultivator embodying my invention. Fig. 2 is a broken plan view particularly intended to show the manner of pivoting the swinging frame. Fig. 3 is a perspective detail of a box for holding the disks and for adjusting it to any desired position, both vertically and with reference to the line of draft. Fig. 4 is a rear elevation of the same, showing the shank of the disk-axle in two positions. Fig. 5 is a cross-sectional detail showing the manner of clamping the shank of the disk-axle in its bearing, and Fig. 6 is a detail showing the pivotal connection of the swinging frame to the cross-piece of the draft-tongue.

In the construction shown in the drawings the supporting-wheels 7 are journaled upon the crank-axles 8, which are controlled from the crank-shaft 9 by the ratchet-lever 10.

11 represents the arch which has the hanger-bars 12 in which the crank-axles rock.

13 represents a cross-bar from which the beams 14 extend rearwardly, said beams being secured at their rear ends to bearings to receive the gangs 16 17. The bearings to which the beams are secured are shown in Figs. 3, 4, and 5 of the drawings, and consist of a casting having a vertical slotted member 18 and a perforated lug 19, through which the horizontal portions of the arch-bar pass, a set-screw 20 being provided to fix the lateral position of the beam, and thereby render the adjustment of the gangs with relation to each other easy. As shown in the drawings, the gangs 16 17 are each composed of two disks mounted upon axles 21, and the shank 15 of each axle is clamped in any desired position in its socket-piece 18 by means of a threaded eyebolt 22, which is inserted by projecting it with its shank end foremost through a slot or opening in the body of the casting forming the bearing and protruding the shank through an aperture in the wall of the bearing opposite the slot. A tightening-nut is turned on the threaded end of the shank, and by adjusting the bolt the shank may be clamped so as to set the disks in any desired position both vertically and laterally.

It will be understood that the gangs 16 17 are similarly mounted, and that in operation they are intended to be set the desired distance apart and with the disks at proper angles and that they are not moved during operation. The disks of the movable gang are marked 23, and they are mounted upon axles 24, having shanks 25, which are held in bearings 18 in all respects similar to those shown in Figs. 3, 4, and 5 and above particularly described. To these bearings are connected the rear ends of the members 30 31 of a swinging frame, which may be pivoted, as shown in Fig. 6, by having its front end provided with a hook 32, engaging a slotted plate 33, bolted to the under side of the draft-tongue 34. The frame members 30 and 31 are connected by an arch 35, whose horizontal members pass through the lugs 19 of the bearings 18, in which shanks 25 are secured. This arch swings with the frame, and the members 30 and 31 can be separated or brought closer together and secured to the arch 35.

It will be understood that the foregoing description and the accompanying drawings refer to a convenient embodiment of my invention which may be employed in a cultivator having a carrying-frame of different construction, and I do not therefore intend to limit my invention to the particular features of construction, except as hereinafter specified in the claims.

The operation and advantages of a cultivator embodying my improvements are as follows: In use it is intended that the outside gangs shall be set in the desired position and there remain during operation, and that the movable gang can be freely swung or moved laterally through the foot-treadles 26, or by handles if the improvements be embodied in a walking-cultivator; and the particular advantage of this arrangement is that it is not necessary to shift all of the disks in order to adjust the implement to variations of the growing plants from a straight line. The swinging frame may, of course, carry more than two disks, but the feature of advantage is in employing a swinging frame carrying cultivator-disks operating on opposite sides of the growing plants and capable of easy lateral vibration, thus accommodating the implement to plants unevenly planted without the labor of shifting all of the disks. Of course the disks carried by the swinging frame may be set at a different angle from the disks of the outer gangs, and such gangs may, as above stated, be set at varying distances from each other, and the disks carried by the movable frame may also be adjusted to and from each other, so as to cultivate close to or farther from the rows of plants, as desired.

Without limiting my invention to precise details of construction, I claim—

1. In a cultivator of the class described, the combination with outer gangs of disks, of a pivoted frame carrying disks adapted to operate on opposite sides of the row of plants and capable of being swung laterally and independently of the outer gangs, substantially as described.

2. In a cultivator of the class described, the combination with draft beams having cultivating disks arranged in gangs, of an intermediate pivoted frame having disks adapted to operate on opposite sides of the row of plants and capable of swinging laterally with its disks and independently of the outer gangs, substantially as described.

3. In a cultivator of the class described, the combination with cultivating disks arranged in gangs and having means for fixing them in relation to each other with an independent swinging frame pivotally connected and carrying cultivating disks adapted to operate on opposite sides of the row of plants and having means for varying their relation to each other and means for swinging the frame upon its pivot, substantially as described.

4. In a cultivator of the class described, the combination with the draft beams and bearings secured therewith, said bearings having a vertically arranged aperture to receive a disk shank and a lateral aperture bisecting the disk shank aperture, a clamping bolt having a shank adapted to be passed through the lateral aperture of the bearings and a head adapted to encircle the disk shank, and a tightening nut whereby the disk shank may be fixed at any desired position in its bearings, substantially as described.

FRANK E. DAVIS.

Witnesses:
C. C. LINTHICUM,
FREDERICK C. GOODWIN.